United States Patent
Turbovich et al.

(10) Patent No.: US 10,133,836 B1
(45) Date of Patent: Nov. 20, 2018

(54) SYSTEMS AND METHODS FOR ON-THE-FLY TEMPERATURE AND LEAKAGE POWER ESTIMATION IN ELECTRONIC CIRCUIT DESIGNS

(71) Applicant: Cadence Design Systems, Inc., San Jose, CA (US)

(72) Inventors: Ophir Turbovich, Haifa (IL); Vasant Ramabadran, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 104 days.

(21) Appl. No.: 15/272,003

(22) Filed: Sep. 21, 2016

(51) Int. Cl.
*G06F 17/50* (2006.01)

(52) U.S. Cl.
CPC ...... *G06F 17/5027* (2013.01); *G06F 17/5054* (2013.01); *G06F 17/5045* (2013.01); *G06F 2217/78* (2013.01); *G06F 2217/80* (2013.01)

(58) Field of Classification Search
CPC ............. G06F 17/5045; G06F 17/5054; G06F 2217/78; G06F 2217/80; G06F 17/5027
See application file for complete search history.

(56) References Cited

U.S. PATENT DOCUMENTS

| | | |
|---|---|---|
| 6,397,170 B1 | 5/2002 | Dean |
| 6,606,729 B2 | 8/2003 | Gross |
| 6,842,714 B1 | 1/2005 | Acar |
| 7,779,381 B2 | 8/2010 | Chickermane |
| 7,814,339 B2 | 10/2010 | Monferrer |
| 8,027,828 B2 | 9/2011 | Bershteyn |
| 8,069,432 B2 | 11/2011 | Zhang |
| 8,086,978 B2 | 12/2011 | Zhang |
| 8,090,568 B2 | 1/2012 | Beausoleil |
| 8,108,194 B2 | 1/2012 | Zhu |
| 8,201,121 B1 | 6/2012 | Sankaralingam |
| 8,453,086 B2 | 5/2013 | Tung |
| 8,543,963 B2 | 9/2013 | Iyer |
| 8,762,922 B1 | 6/2014 | Roy |
| 9,020,797 B2 | 4/2015 | Lin |
| 2007/0244676 A1* | 10/2007 | Shang .................. G06F 17/5018 703/2 |
| 2016/0092616 A1* | 3/2016 | Coutts ................. G06F 17/5009 703/2 |

* cited by examiner

*Primary Examiner* — Stacy Whitmore
(74) *Attorney, Agent, or Firm* — McDermott Will & Emery LLP (57) ABSTRACT

A method for on-the-fly determination of leakage power and temperature of an electronic circuit design is provided. The method includes calculating a dynamic power of the electronic circuit design. The method also includes calculating a total power consumption of the electronic circuit design. The method further includes averaging the total power consumption to obtain an average total power, determining a temperature of the electronic circuit design based on the average total power, and determining a leakage power of the electronic circuit design based on the temperature. A system and a non-transitory, computer-readable medium storing computer-readable instructions to perform the above method are also provided.

16 Claims, 5 Drawing Sheets

SYSTEMS AND METHODS FOR ON-THE-FLY TEMPERATURE AND LEAKAGE POWER ESTIMATION IN ELECTRONIC CIRCUIT DESIGNS

TECHNICAL FIELD

Embodiments described herein are generally related to the field of electronic circuits and electronic circuit design, and, more specifically, to systems and methods for on-the-fly estimation of temperature and leakage power of an electronic circuit design.

BACKGROUND

The power consumed by an electronic circuit (e.g., an integrated circuit) can be categorized into two main components—dynamic power and leakage power. Dynamic power consumption occurs due to transistor switching activity. Each time a logic gate in the electronic circuit changes state (i.e., from a one to a zero or vice-versa), it charges or discharges the associated parasitic load capacitances. Leakage power consumption is due to leakage currents drawn continuously from the power supply of the electronic circuit. There are various modes that contribute to leakage current, such as subthreshold leakage, reverse-biased PN junctions, drain-induced barrier lowering (DIBL), gate-induced drain leakage, punchthrough currents, gate oxide tunneling, and hot carrier effects.

The total power consumption of an electronic circuit is a sum of the dynamic power and leakage power of each cell of the circuit. Existing simulation tools for estimating total power consumption in electronic circuits commonly estimate the dynamic power and the leakage power independent of each other.

During circuit simulation, circuit designers determine leakage power at different temperatures (e.g., −40° C., 25° C., and 125° C.) and for different process corners (e.g., fast-fast, slow-slow, fast-slow, slow-fast). Although leakage power varies exponentially with temperature, circuit designers choose either a best case scenario (e.g., slow-slow at −40° C.) or a worst case scenario (fast-fast at 125° C.) during simulation. This is because it is difficult to estimate the temperature variations "on-the-fly" during circuit simulation.

The description provided in the background section should not be assumed to be prior art merely because it is mentioned in or associated with the background section. The background section may include information that describes one or more aspects of the subject technology.

SUMMARY

In certain aspects, a method for on-the-fly determination of leakage power and temperature of an electronic circuit design includes calculating a dynamic power of an electronic circuit design and calculating a total power consumption of the electronic circuit design. The method also includes averaging the total power consumption to obtain an average total power and determining a temperature of the electronic circuit design based on the obtained average total power. The method further includes determining a leakage power of the electronic circuit design based on the temperature.

In certain aspects, a system is described that includes an apparatus that includes an electronic circuit design and a memory storing computer-readable program code. The apparatus executes the computer-readable program code and causes the apparatus to calculate a dynamic power of the electronic circuit design and calculate a total power consumption of the electronic circuit design. Further, the processor causes the system to average the total power consumption to obtain an average total power and determine a temperature of the electronic circuit design on-the-fly and based on the average total power. In some embodiments, the processor causes the system to determine the leakage power of the electronic circuit design on-the-fly and based on the temperature and update the total power consumption based on the leakage power and the dynamic power.

In certain aspects, a non-transitory, computer-readable storage medium is described that includes computer-readable program code for causing a processor to control an apparatus that executes a method. The method includes calculating a dynamic power of an electronic circuit design and calculating a total power consumption of the electronic circuit design. The method further includes averaging the total power consumption to obtain an average total power, and determining a relationship between the temperature of the electronic circuit design and the average total power to determine the temperature on-the-fly and based on the relationship. The method also includes determining a relationship between the temperature of the electronic circuit design and the leakage power to determine the leakage power on-the-fly and based on the relationship.

In certain aspects, a system is described that includes a means for storing computer code. The system further includes a means to execute the computer code for calculating a dynamic power of an electronic circuit design and calculating a total power consumption of the electronic circuit design. Further, the means to execute the computer code is configured for averaging the total power consumption to obtain an average total power and determining a temperature of the electronic circuit design based on the average total power. In some embodiments, the means to execute the computer code is configured for determining a leakage power of the electronic circuit design based on the temperature.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Systems and methods described herein are generally related to the field of electronic circuits, and, more specifically, to systems and methods for on-the-fly estimation of temperature and leakage power of an electronic circuit design.

The disclosed systems and methods address a deficiency tied to computer technology and arising in the realm of computer simulation of hardware, namely, the inability of existing Electronic Design Automation (EDA) tools to estimate leakage power in an electronic circuit design on-the-fly. The disclosed systems and methods overcome this deficiency by averaging the total power consumption in the electronic circuit during operation thereof and determining the temperature based on the average total power. The leakage power is then obtained from the temperature information. As mentioned above, dynamic power consumption occurs during the operation of the circuit. Because total power (and thus average total power) is dependent on the dynamic power of the electronic circuit design, any change in dynamic power will result in a corresponding change in the average total power, which will result in a change in the temperature of the electronic circuit design. The change in the temperature will then result in a corresponding change in leakage power. As a result, changes in the operation of the electronic circuit design result in an on-the-fly estimation of the temperature and leakage power of the electronic circuit design.

Because of the disclosed on-the-fly estimation of the leakage power, circuit simulation can more accurately estimate the leakage power of the electronic circuit design, and results in improved simulation software.

As used herein, the terms "on-the-fly" and variations thereof describe activities that develop or occur dynamically rather than as the result of something that is statically predefined. Stated otherwise, "on-the-fly" is used to describe something that is being changed while the process that the change affects is ongoing.

Figure 1:
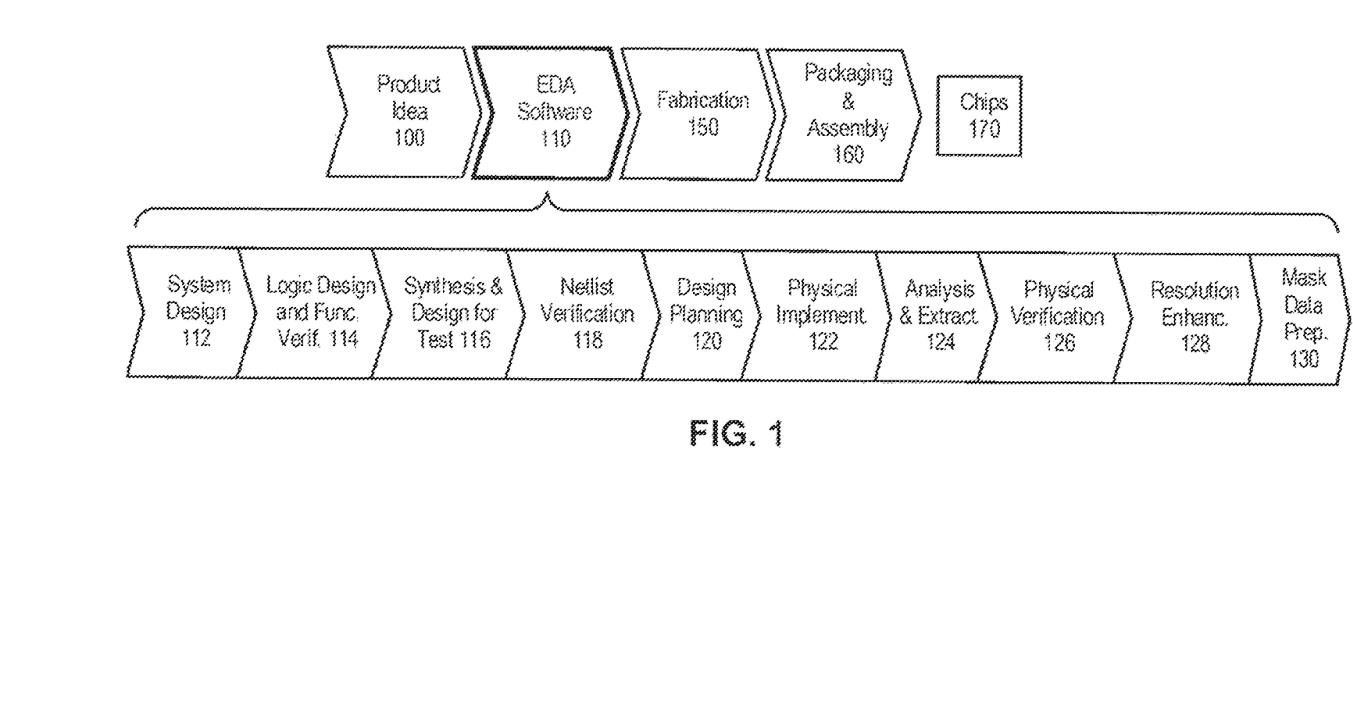
FIG. 1 illustrates various steps in the design and fabrication of an integrated circuit.

FIG. 1 illustrates an example process 100 of the design and fabrication of an integrated circuit. The process 100 starts with a product idea 105 from which an electronic circuit design is generated using one or more EDA tools 110. Examples of the electronic circuit design include microprocessor designs, microcontroller unit (MCU) designs, system-on-chip (SOC) designs, application specific integrated circuit (ASIC) designs, and the like. Integrated circuits or "chips" 170 may then be manufactured based on the finalized electronic circuit design by performing fabrication 150 and packaging and assembly 160 steps.

As illustrated, the electronic circuit design undergoes multiple design flow steps 112-130 before the finalized electronic circuit design is generated. It should be noted that the design flow steps 112-130 are illustrated solely as an example and may be modified as required based on the application and design. For example, the design flow steps 112-130 may be performed in a different sequence than the sequence illustrated in FIG. 1.

In the system design step 112, a circuit designer can describe the functionality to implement. Additionally, the designer can also perform a what-if planning to refine the functionality and to check costs. Further, hardware-software architecture partitioning can occur at this step. In the logic design and functional verification step 114, a VHDL or Verilog design can be created and checked for functional accuracy.

In the synthesis and design step 116, the VHDL/Verilog code can be translated to a netlist, which is a description of the connectivity of an electronic circuit, and which can be optimized for the target technology. The netlist may include a list of terminals ("pins") of the components in the electronic circuit design and a list of the electrical conductors (or "nets") that interconnect the terminals. Further, in this step, tests can be designed and implemented to check the finished chips. In the netlist verification step 118, the netlist can be checked for compliance with timing constraints and for correspondence with the VHDL/Verilog code.

In the design planning step 120, an overall floor plan for the chip can be constructed and analyzed for timing and top-level routing. In this step, the available area for implementing the electronic circuit is analyzed to ensure optimum utilization of the available area. The analysis is commonly performed based on a utilization ratio, which is a percentage of area used by the components of the electronic circuit design as opposed to the area used by the nets. If the utilization ratio is high, then routing congestion may be an issue. Alternatively, if the utilization ratio is too low, the available area may be wasted. Next, in the physical implementation step 122, placement and routing can be performed. The placement may decide where to place the electronic components in available area and this is followed by routing, which decides the design of all the electrical conductors needed to connect the placed electronic components. In the analysis and extraction step 124, the circuit functionality can be verified at a transistor level. In this step, the topological layout of the electronic circuit design is translated back into the electrical circuit it is intended to represent, and the functionality of the translated circuit is verified. In the physical verification step 126, the design can be checked to ensure correctness for manufacturing, electrical issues, lithographic issues, and circuitry. This step includes checking if the electronic circuit design can actually be manufactured, and that the resulting chips will not have any physical defects that prevent correct functionality, and will meet original specifications.

In the resolution enhancement step 128, geometric manipulations can be performed on the layout to improve manufacturability of the design. Finally, in the mask data preparation step 130, the electronic circuit design can be taped-out for production of masks to produce finished chips. Embodiments disclosed herein can be performed in one or more of the above-described design flow steps 112-130.

Figure 2:
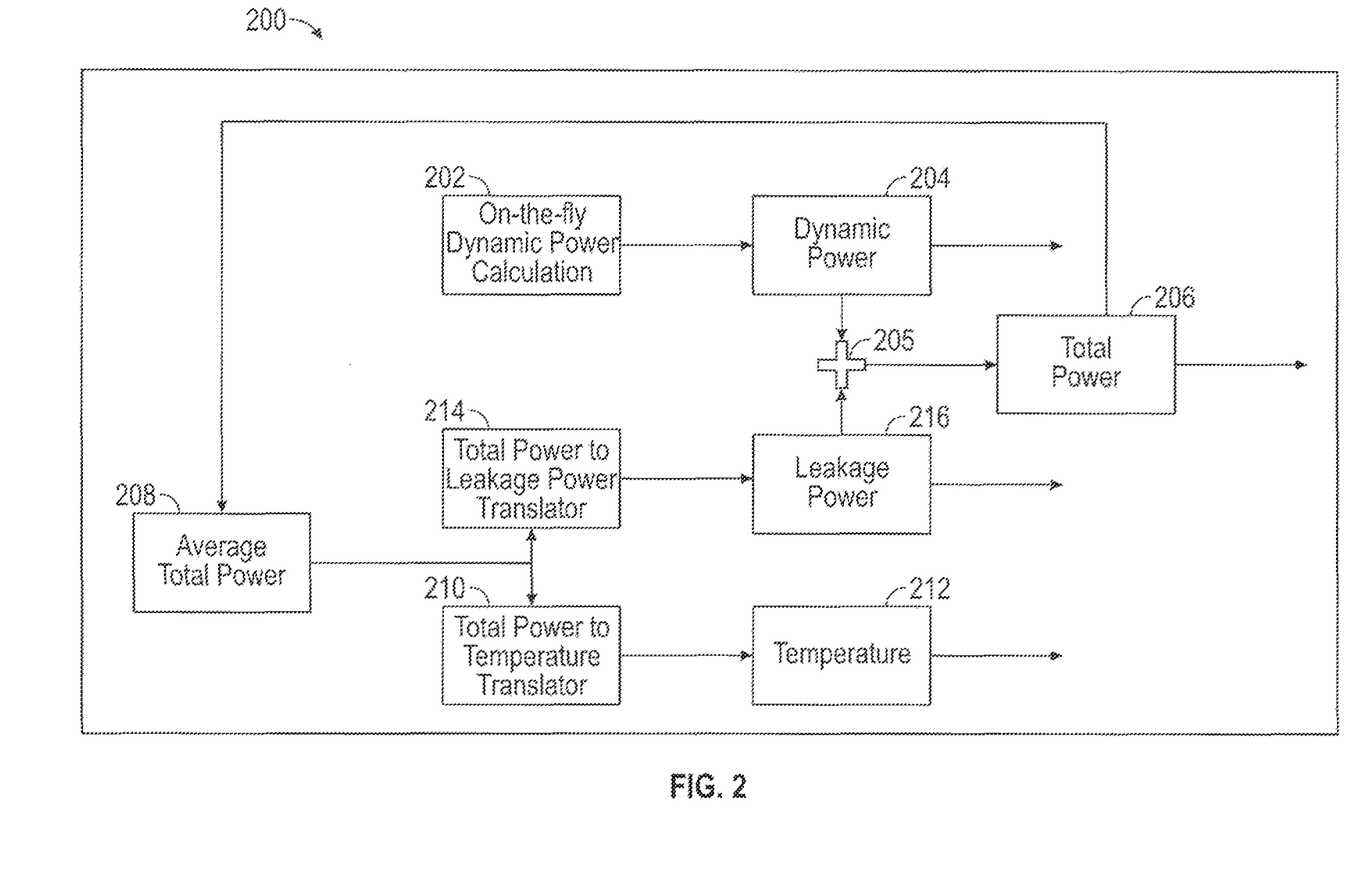
FIG. 2 illustrates an example method for on-the-fly determination of leakage power and temperature of an electronic circuit design, according to some embodiments.

FIG. 2 is a flow chart illustrating steps in a method 200 for on-the-fly estimation of temperature and leakage power and obtaining the total power consumption of an electronic circuit design, according to one or more embodiments. As disclosed below, the method 200 (or at least a portion thereof) may be performed using one or more apparatuses including, but not limited to, a logic simulation system, a hardware emulation system, and a programmable logic device (e.g., a Field Programmable Gate Array (FPGA)). Further, the method 200 may include retrieving, editing, and/or storing files in a database that is part of, or is communicably coupled to, the apparatuses. Methods consistent with the present disclosure may include at least some, but not all of the steps illustrated in method 200, performed in a different sequence. Furthermore, methods consistent with the present disclosure may include at least two or more steps as in method 200 performed overlapping in time, or almost simultaneously.

The method 200 includes determining the on-the-fly dynamic power of the electronic circuit design, as at 202. In an embodiment, the electronic circuit design may be implemented/stored/programmed into the one or more apparatuses stated above.

In an embodiment, determining the dynamic power may include calculating the number of flip-flops that toggle in a specific cycle (also referred to as the flip-flop "toggle count"). Since dynamic power is directly proportional to the amount of switching activity (the toggle count, in this case), by measuring the toggle count, the dynamic power of the electronic circuit design can be estimated. In another embodiment, once the net toggle count is obtained, the net toggle count can be weighted based on a predetermined weight. For instance, the weight may be an estimate of how often a particular flip-flop (or a group of flip-flops) will toggle with respect to the other flip-flops (or other groups of flip-flops). By assigning different weights to the flip-flops, the dynamic power can be determined more accurately.

The dynamic power of the electronic circuit design is then obtained, as at 204. In some embodiments, the dynamic power may be averaged over a desired time period to obtain an average dynamic power of the electronic circuit design.

The method 200 may further include determining the leakage power in the electronic circuit design. The leakage power obtained may then be added to the total dynamic power (obtained at 204) to obtain the total power of the electronic circuit design, as at 206.

In order to determine the leakage power, the method 200 may average the total power (obtained at 206) over a relatively long period of time to obtain an average total power, as at 208. For example, the time period over which the total power is averaged may be around 1 million to around 10 million clock cycles.

The temperature of the electronic circuit is directly proportional to the total power of the electronic circuit. Stated otherwise, the higher the average power of the electronic circuit, higher is the temperature of the electronic circuit. Because the temperature rise is typically gradual, it may be desirable to average the total power over a relatively longer time period.

The method 200 may determine the temperature of the electronic circuit design based on the average total power obtained at 208. In an embodiment, the method 200 may simulate the operation of the electronic circuit design to determine the temperature based on the average total power. In determining the temperature, the method 200 may consider the properties and/or configuration of the target electronic device on which the final electronic circuit is to be implemented. For example, the target electronic device may be an Application Specific Integrated Circuit (ASIC). The method 200 may consider the structure/type of packaging of the target electronic device, the printed circuit board (PCB) of the target electronic device, the configuration, material, and other properties of a heat sink used in the target electronic device, the configuration of any cooling mechanisms used to dissipate heat from the target electronic device, and any other properties of the target electronic device that influence the temperature of the target electronic device.

A relationship between the average total power and the temperature may be obtained, as at 210. From the relationship, the temperature may be obtained, as at 212. The relationship obtained can be used to emulate an operation of a temperature diode used to estimate total power consumption in electronic circuits. For example, the relationship may be in a form of a translation table that includes the temperature of the electronic circuit design for different values of the average power. Alternatively, the relationship may be defined using a mathematical equation(s) or an algorithm(s).

The leakage power and temperature are exponentially related to each other. Generally, the leakage power values for different values of temperature (e.g., −40 C, 25 C, and 125 C) may be provided in a standard cells library (e.g., created by the standard cell vendor). The standard cell library includes the temperature and the leakage power information for different process corners.

Based on the relationship between the leakage power and temperature, and between the temperature and the average total power, a relationship between the leakage power and the average total power may be obtained, as at 214. For example, the relationship may be defined as a translation table that includes the leakage power value for different values of the average total power. Alternatively, the relationship may be defined using a mathematical equation(s) or an algorithm(s). From the relationship, the leakage power for different values of average total power may be obtained, as at 216.

As mentioned above, the leakage power obtained at 216 may then be combined (as at 205) with the dynamic power obtained at 204 to result in the total power consumption, as at 206. It should be noted that the leakage power obtained at 216 may be dependent on the time period over which the total power is averaged and may thus change when the time period changes. Additionally, the dynamic power obtained at 204 may vary as during operation of the electronic circuit design. Thus, in an embodiment, the method 200 may update the total power consumption based on a change in the leakage power and the dynamic power.

It should be noted that the relationship between the average total power and the temperature obtained at 210 and the relationship between the leakage power and the average total power obtained at 214 are unique for every electronic circuit design and for every target electronic device on which the electronic circuit is implemented. As a result, prior to simulating the electronic circuit design, it may be required to have information regarding the target electronic device in order to create conditions or an environment in which the simulation is to be performed. For instance, the information may include the die parameters (e.g., the process corner of the die) of the target electronic device, the base operating temperature of the target electronic device, the package type of the target electronic device, and the like.

An example will now be described using the example method of FIG. 2 to determine leakage power and temperature of an electronic circuit on-the-fly. Initially, the temperature of the electronic circuit is relatively low and, therefore, leakage power consumption is low. As the temperature of the electronic circuit gradually increases (e.g., because of prolonged usage or because of running resource intensive applications), the leakage power increases. As a result, the total power consumption of the electronic circuit also increases. The average total power may then be obtained by averaging the total power over a relatively long period of time, around 1 million to around 10 million clock cycles.

Based on a relationship between the average total power and the temperature, the temperature of the electronic circuit during operation may be determined. The leakage power may then be determined from the temperature. The leakage power may be combined with (e.g., added to) the dynamic power and leakage power, and the total power can be determined.

During operation, the dynamic power of the electronic circuit may change (increase or decrease) and, as a result, the total power consumption and the average total power may change. This will cause a corresponding change in the temperature and the leakage power in the electronic circuit. Thus, the leakage power and temperature can be determined on-the-fly.

Figure 3:
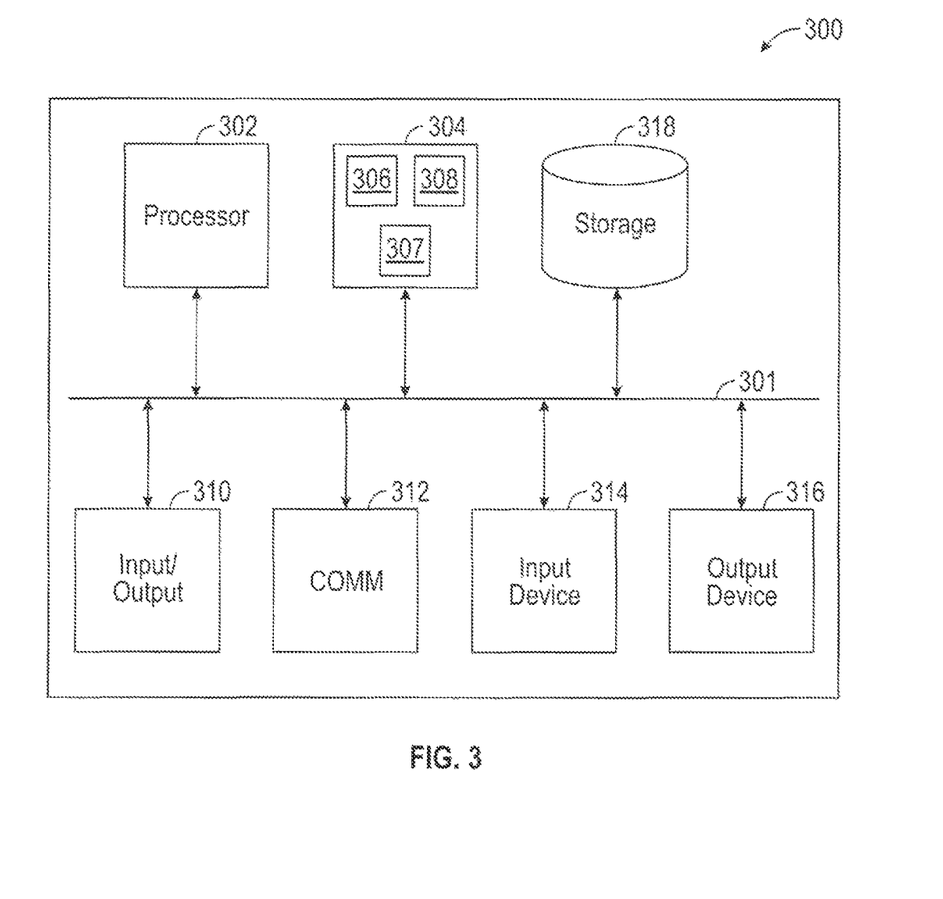
FIG. 3 is a block diagram illustrating a logic simulation system for implementing the method of FIG. 2, according to some embodiments.

FIG. 3 is a block diagram illustrating an example logic simulation system 300 for implementing the method 200, according to some embodiments. The logic simulation system 300 may include a processor 302 for executing a circuit simulation program (also referred to as a logic simulator) 306 stored in one or more memory devices 304 (one shown) communicably coupled to the processor 302. The circuit simulation program 306 may generally be a computer-readable program code that may create an execution environment for implementing the method 200. The processor 302 may be a general-purpose microprocessor, a microcontroller, a controller, a special purpose simulation hardware designed for implementing the method 200, or any other suitable entity that can perform calculations or other manipulations of information. The one or more memory devices 304 may include one or more non-transitory computer-readable storage media, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. Processor 302 and memory 304 can be supplemented by, or incorporated in, special purpose logic circuitry.

The memory device 304 may store therein the electronic circuit design, of which the temperature and the leakage power are to be estimated on-the-fly, in the form of a hardware description language (HDL) (e.g., VHDL or Verilog) source code 308. The memory device 304 may also store a HDL source code 307, which then executed performs the example method 200 based on data (or other information) received on-the-fly from the HDL source code 308. In an example, the data may be or include the flip-flop "toggle count" of the electronic circuit design.

In order to load the HDL source codes 307, 308 in the memory device 304, the logic simulation system 300 may include one or more input/output modules 310 (one shown) via which the HDL source codes 307, 308 may be loaded into the memory device 304. The input/output module 310 is any input/output module. Example input/output modules 310 include data ports such as USB ports. The input/output module 310 is configured to connect to a communications module 312. Example communications modules 312 include networking interface cards, such as Ethernet cards and modems.

The logic simulation system 300 further includes a data storage device 318 such as a magnetic disk or optical disk for storing information and instructions.

In certain aspects, the input/output module 310 is configured to connect to a plurality of devices, such as an input device 314 and/or an output device 316. Example input devices 314 include a keyboard and a pointing device, e.g., a mouse or a trackball, by which a user can provide input to the logic simulation system 300. Other kinds of input devices 314 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 316 include display devices, such as a LED (light emitting diode), CRT (cathode ray tube), or LCD (liquid crystal display) screen, for displaying information to the user.

Each of the components 302, 304, 310, 312, 314, and 318 may be communicably coupled to each other via a system bus 301 or other communication mechanism for exchanging information and instructions therebetween.

The logic simulation system 300 may include servers and personal computer devices. A personal computing device and server are generally remote from each other and typically interact through a communication network. The relationship of client and server arises by virtue of computer programs running on the respective computers and having a client-server relationship to each other. The logic simulation system 300 can be, for example, and without limitation, a desktop computer, laptop computer, or tablet computer. According to one aspect, the logic simulation system 300 can be a cloud computing server of an infrastructure-as-a-service (IaaS) that is able to support platform-as-a-service (PaaS) and software-as-a-service (SaaS) services.

Figure 4:
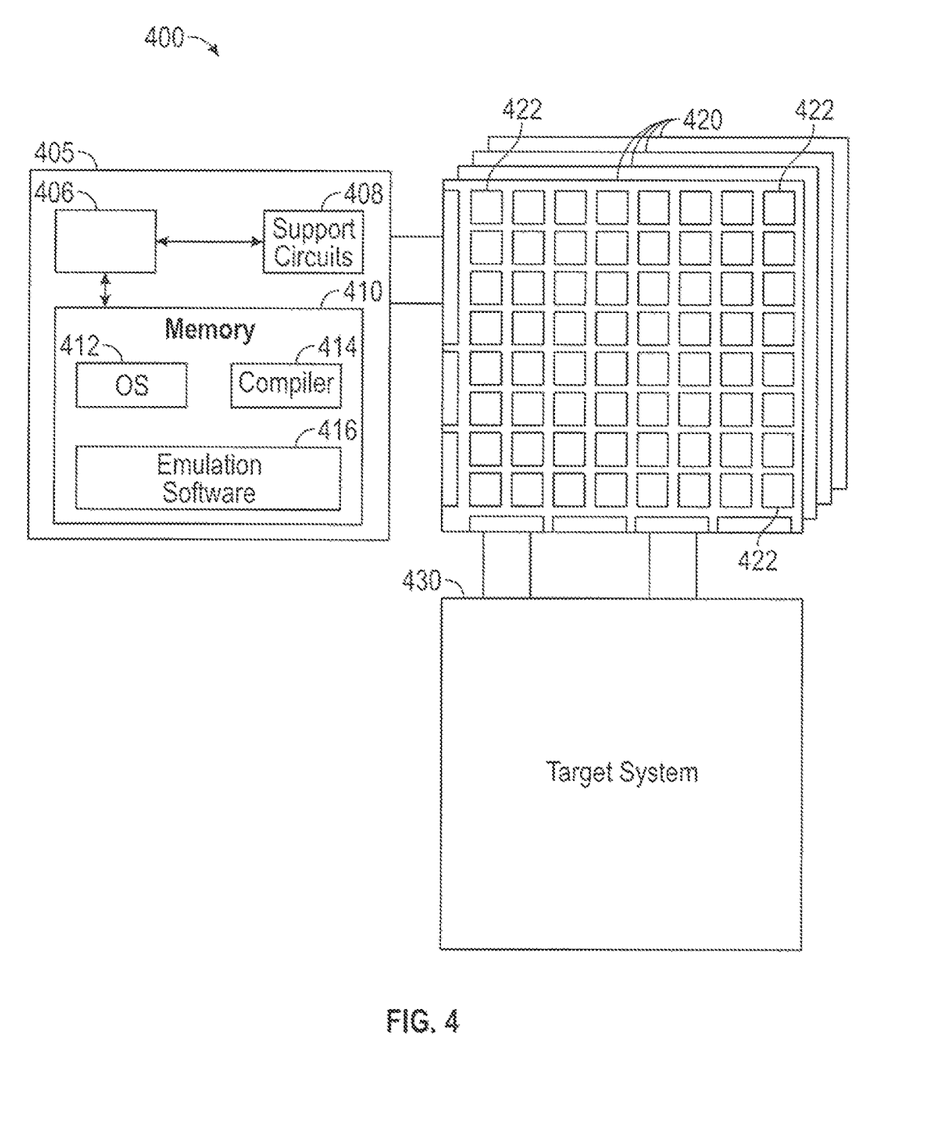
FIG. 4 depicts an overview of a hardware emulation system for implementing the method of FIG. 2, according to some embodiments.

FIG. 4 depicts an overview of a hardware emulation system 400 for implementing the example method 200, according to some embodiments. Typically, the hardware emulation system 400 is a processor-based programmable device to emulate a hardware design. The hardware emulation system 400 may include a computer workstation 405, one or more emulation boards 420, and a target system 430. The computer workstation 405 may provide emulation support facilities to the emulation boards 220.

The computer workstation 405 comprises at least one processor 406, support circuits 408, and one or more memory devices 410 (one shown). The processor 406 may comprise one or more conventionally available microprocessors, microcontrollers, a special purpose emulation hardware designed for implementing the method 200, or any other suitable entity that can perform calculations or other manipulations of information. According to one aspect, the computer workstation 405 can be a cloud computing server of an infrastructure-as-a-service (IaaS) that is able to support platform-as-a-service (PaaS) and software-as-a-service (SaaS) services. The support circuits 408 may support the operation of the processor 406 and may include circuits including, but not limited to, power supplies circuits, input/output interface circuitry, cache circuitry, and the like.

The memory device 410 may include one or more non-transitory computer-readable storage media, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. The memory device 410 stores various forms of software and files, such as operating system (OS) 412, a compiler 414, and emulation software 416. The compiler 414 may convert an electronic circuit design, e.g., an electronic circuit described using an HDL (e.g., VHDL or Verilog) source code, to a sequence of instructions that provide data (or other information) on-the-fly to the emulation software 416 and can be evaluated using the emulation board 420. In an example, the data may be or include the flip-flop "toggle count" of the electronic circuit design. The emulation software 416 may be or include a program code, which when executed performs the example method 200 for estimating the temperature and leakage power of the electronic circuit design on-the-fly.

The computer workstation 405 may permit a user to interface with the emulation boards 420, control the emulation process and collect emulation results for analysis. Each emulation board 420 may be composed of individual emulation circuits, collectively referred to 422. Typically, the emulation circuits 422 are integrated circuits (also referred to herein as emulation chips). Under control of the computer workstation 405, programming information and data is loaded to the emulation board 420. In response to the execution of the emulation software 416, the emulation board 420 may emulate the target system 430 (or a portion thereof). In an example, the target system 430 may be or include the electronic circuit design (described using an HDL source code) of which the temperature and leakage power is to be estimated on-the-fly.

Figure 5:
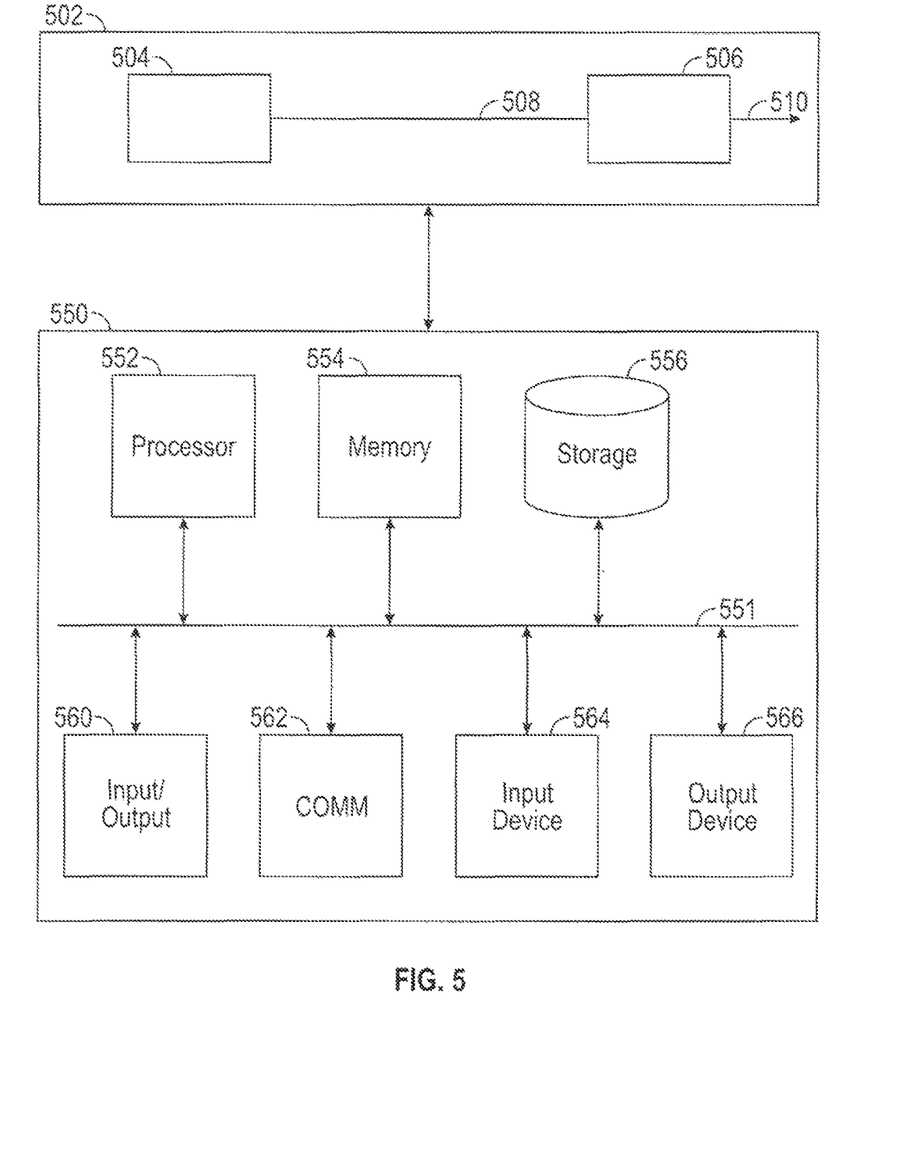
FIG. 5 is a block diagram illustrating a programmable logic device for implementing the method of FIG. 2, according to some embodiments.

FIG. 5 is a block diagram illustrating an example programmable logic device 502 for implementing the example method 200, according to some embodiments. In an example, the programmable logic device 502 may be or include a Field Programmable Gate Array (FPGA). In other embodiments, the programmable logic device 502 may be a general-purpose microprocessor, a microcontroller, a Digital Signal Processor (DSP), an Application Specific Integrated Circuit (ASIC), a Programmable Logic Device (PLD), a controller, a state machine, discrete programmable hardware components, or any other suitable entity that can implement the example method 200. Although not expressly illustrated in FIG. 5, it will be understood that the programmable logic device 502 may include other logic circuits, such as memory blocks, calculating circuits, transceivers, protocol controllers, digital signal processor(s) (DSP), analog-to-digital convertor(s) (ADC), digital-to-analog convertor(s) (DAC), or any other suitable entities that may be used to implement the example method 200.

The programmable logic device 502 may store therein the electronic circuit design, of which the temperature and the leakage power are to be estimated on-the-fly, in the form of a hardware description language (HDL) (e.g., VHDL or Verilog) source code 504. The example method 200 may also be implemented on the programmable logic device 502 in the form of a HDL source code 506 that receives on-the-fly data (or other information) 508. In an example, the data may be or include the flip-flop "toggle count" of the electronic circuit design. The output 510 from the HDL source code 506 may be or include the total power and/or the temperature of the electronic circuit design.

The programmable logic device 502 may be communicably coupled (e.g., wired or wireless) to a computer system 550 for programming the programmable logic device 502 with the HDL source codes 504, 506. The computer system 550 may include a bus 551 or other communication mechanism for communicating information, and a processor 552 coupled with bus 551 for processing information. According to one aspect, the computer system 550 can be a cloud computing server of an infrastructure-as-a-service (IaaS) that is able to support platform-as-a-service (PaaS) and software-as-a-service (SaaS) services. The processor 552 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The processor 552 may be communicably coupled to a memory 554 that may store computer-readable program code to control the operations of the computer system 550. For example, the operations may include programming the programmable logic device 502 with the HDL source codes 504, 506, controlling the operation of the programmable logic device 502 for implementing the method 200, and the like. The memory 554 may include one or more non-transitory computer-readable storage media, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device.

The computer-readable program code may be implemented in one or more computer program products, i.e., one or more modules of computer-readable instructions encoded on a computer-readable storage medium for execution by, or to control the operation of, the computer system 550, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. The memory 554 may also be used for storing temporary variable or other intermediate information during execution of instructions to be executed by processor 552.

A computer program code as discussed herein does not necessarily correspond to a file in a file system. A program code can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program code can be deployed to be executed on one computer or on multiple computers that are located at one site or distributed across multiple sites and interconnected by a communication network. The processes and logic flows described in this specification can be performed by one or more programmable processors executing one or more computer program codes to perform functions by operating on input data and generating output.

Computer system 550 further includes a data storage device 556 such as a magnetic disk or optical disk, coupled to the bus 551 for storing information and instructions.

Computer system 550 is coupled via input/output module 560 to various devices. The input/output module 560 is any input/output module. Example input/output modules 560 include data ports such as USB ports. The input/output module 560 is configured to connect to a communications module 562. Example communications modules 562 include networking interface cards, such as Ethernet cards and modems. In certain aspects, the input/output module 560 is configured to connect to a plurality of devices, such as an input device 564 and/or an output device 566. Example input devices 564 include a keyboard and a pointing device, e.g., a mouse or a trackball, by which a user can provide input to the computer system 550. Other kinds of input devices 564 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 566 include display devices, such as a LED (light emitting diode), CRT (cathode ray tube), or LCD (liquid crystal display) screen, for displaying information to the user.

Methods as disclosed herein may be performed by the computer system 550 in response to processor 552 executing one or more sequences of one or more computer-program code contained in the memory 554. Such instructions may be read into the memory 554 from another computer-readable storage medium, such as data storage device 556. Execution of the sequences of instructions contained in memory 554 causes processor 552 to perform the method steps described herein (e.g., method 200). One or more processors in a multi-processing arrangement may also be employed to execute the sequences of instructions contained in memory 554. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 550 includes servers and personal computer devices. A personal computing device and server are generally remote from each other and typically interact through a communication network. The relationship of client and server arises by virtue of computer programs running on the respective computers and having a client-server relationship to each other. Computer system 550 can be, for example, and without limitation, a desktop computer, laptop computer, or tablet computer. Computer system 550 can also be embedded in another device, for example, and without limitation, a mobile telephone, a personal digital assistant (PDA), a mobile audio player, a Global Positioning System (GPS) receiver, a video game console, and/or a television set top box.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for fabricating an electronic circuit, comprising:
    determining leakage power and temperature of a design of the electronic circuit on-the-fly by:
        calculating a dynamic power of the design;
        calculating a total power consumption of the design;
        averaging the total power consumption to obtain an average total power;
        determining a temperature of the design based on the average total power; and
        determining a leakage power of the design based on the temperature; and
    fabricating the electronic circuit based on the dynamic power and leakage power consumption.

2. The computer-implemented method of claim 1, further comprising:
    updating the total power consumption based on the leakage power and the dynamic power; and
    fabricating the electronic circuit based on the updated total power consumption.

3. The computer-implemented method of claim 1, wherein determining the temperature of the electronic circuit design comprises determining a relationship between the temperature of the electronic circuit design and the average total power and determining the temperature based on the relationship.

4. The computer-implemented method of claim 3, further comprising emulating an operation of a temperature diode based on the relationship.

5. The computer-implemented method of claim 1, wherein determining the leakage power of the electronic circuit design comprises determining a relationship between the temperature of the electronic circuit design and the leakage power, and determining the leakage power based on the relationship.

6. The computer-implemented method of claim 1, wherein averaging the total power consumption comprises averaging the total power consumption over about one million to about 10 million clock cycles.

7. A system, comprising:
    an apparatus including:
        a processor; and
        a memory communicably coupled to the processor and storing a program code, which when executed by the processor configures the apparatus to:
            calculate a dynamic power of a design of an electronic circuit;

calculate a total power consumption of the design;

average the total power consumption to obtain an average total power;

determine a temperature of the design on-the-fly and based on the average total power;

determine a leakage power of the design on-the-fly and based on the temperature; and update the total power consumption based on the leakage power and the dynamic power; and a circuit fabrication system communicably coupled to the apparatus and fabricating the electronic circuit based on the updated total power consumption.

8. The system of claim 7, wherein the apparatus is one of a logic simulation system, a hardware emulation system, and a programmable logic device.

9. The system of claim 7, wherein executing the program code further configures the apparatus to determine a relationship between the temperature of the electronic circuit design and the average total power and determine the temperature based on the relationship.

10. The system of claim 9, wherein executing the program code further configures the apparatus to emulate an operation of a temperature diode based on the relationship.

11. The system of claim 7, wherein executing the program code further configures the apparatus to determine a relationship between the temperature of the electronic circuit design and the leakage power and determine the leakage power based on the relationship.

12. The system of claim 7, wherein executing the program code further configures the apparatus to average the total power consumption over about one million to about 10 million clock cycles.

13. A non-transitory, computer-readable storage medium comprising computer-readable program code that, when executed by a processor, causes the processor to control an apparatus for performing a method for determining leakage power and temperature of an electronic circuit design on-the-fly, wherein the apparatus is communicably coupled to a circuit fabrication system configured to fabricate the electronic circuit, the method comprising:

calculating a dynamic power of the electronic circuit design;

calculating a total power consumption of the electronic circuit design;

averaging the total power consumption to obtain an average total power;

determining a relationship between the temperature of the electronic circuit design and the average total power to determine the temperature on-the-fly and based on the relationship;

determining a relationship between the temperature of the electronic circuit design and the leakage power to determine the leakage power on-the-fly and based on the relationship; and providing leakage power and dynamic power to the circuit fabrication system and fabricating the electronic circuit using the leakage power and dynamic power.

14. The non-transitory, computer-readable storage medium of claim 13, wherein executing the computer-readable program code further causes the processor to control the apparatus for performing the method that further comprises emulating an operation of a temperature diode based on the relationship between the temperature of the electronic circuit design and the average total power.

15. The non-transitory, computer-readable storage medium of claim 13, wherein executing the computer-readable program code further causes the processor to control the apparatus for performing the method that further comprises updating the total power consumption based on the leakage power and the dynamic power.

16. The non-transitory, computer-readable storage medium of claim 13, wherein executing the computer-readable program code further causes the processor to control the apparatus for performing the method that further comprises averaging the total power consumption over about one million to about 10 million clock cycles.

* * * * *